(12) United States Patent
Koren et al.

(10) Patent No.: US 11,989,329 B2
(45) Date of Patent: *May 21, 2024

(54) SYSTEM AND METHOD FOR PRIVACY POLICY ENFORCEMENT

(71) Applicant: Privacy Rating Ltd., Ganey-Tikva (IL)

(72) Inventors: Yoseph Koren, Ganey-Tikva (IL); Yehonatan Wasserman, Kiryat-Ono (IL)

(73) Assignee: Privacy Rating Ltd., Ganey-Tikva (IL)

( * ) Notice: Subject to any disclaimer, the term of this patent is extended or adjusted under 35 U.S.C. 154(b) by 110 days.

This patent is subject to a terminal disclaimer.

(21) Appl. No.: 17/322,962

(22) Filed: May 18, 2021

(65) Prior Publication Data

US 2021/0271776 A1    Sep. 2, 2021

Related U.S. Application Data

(63) Continuation of application No. 16/301,746, filed as application No. PCT/IL2017/050522 on May 11, 2017, now Pat. No. 11,023,617.

(Continued)

(51) Int. Cl.
*H04L 29/06* (2006.01)
*G06F 21/60* (2013.01)
(Continued)

(52) U.S. Cl.
CPC ........ G06F 21/6272 (2013.01); G06F 21/602 (2013.01); G06F 21/606 (2013.01);
(Continued)

(58) Field of Classification Search
CPC .. G06F 21/6272; G06F 21/602; G06F 21/606; G06F 2221/2107; G06F 11/0781;
(Continued)

(56) References Cited

U.S. PATENT DOCUMENTS

2007/0250904 A1    10/2007 Waller
2009/0300716 A1    12/2009 Ahn
(Continued)

FOREIGN PATENT DOCUMENTS

WO    WO 2015/016828    2/2015

OTHER PUBLICATIONS

Supplementary European Search Report for Application No. EP17798873, dated Nov. 21, 2019.
(Continued)

*Primary Examiner* — Wasika Nipa
*Assistant Examiner* — Leynna Truvan
(74) *Attorney, Agent, or Firm* — PEARL COHEN ZEDEK LATZER BARATZ LLP

(57) ABSTRACT

A system and method for privacy policy enforcement to ensure reconciliation between users communicating via an open system interconnection (OSI) communication architecture, with receiving of a privacy policy for at least one user's device and a usage policy for at least one user, receiving encryption codes, receiving private data from a first user to be sent to a second user, encrypting by a first server the received data, receiving a privacy policy enforcement vector, and performing selective decryption, by a second server, for each data segment, wherein data segments that correspond to a match between the privacy policy and usage policy are decrypted, and wherein at least one of the first server and the second server is external to the first user and second user.

20 Claims, 6 Drawing Sheets

Related U.S. Application Data

(60) Provisional application No. 62/336,764, filed on May 16, 2016.

(51) Int. Cl.
*G06F 21/62* (2013.01)
*H04L 41/50* (2022.01)
*H04L 41/5003* (2022.01)

(52) U.S. Cl.
CPC ........ *H04L 41/5003* (2013.01); *H04L 41/508* (2013.01); *G06F 2221/2107* (2013.01)

(58) Field of Classification Search
CPC ............. G06F 2212/502; G06F 21/316; H04L 41/5003; H04L 41/508; H04L 63/0428; H04L 63/20; H04L 29/06115; H04L 29/08009; H04L 61/1582; H04L 63/123; H04L 63/06; H04W 12/00; H04W 72/0493; H04W 72/1257; H04W 72/535; G06Q 2220/10; G11B 20/00731; H04N 21/8355; H04N 2201/3246; H04N 1/4486; H04Q 2213/13567; H04M 1/2753
See application file for complete search history.

(56) References Cited

U.S. PATENT DOCUMENTS

| | | | |
|---|---|---|---|
| 2011/0106795 A1* | 5/2011 | Maim | G06F 16/958 707/769 |
| 2012/0110680 A1 | 5/2012 | Oliver et al. | |
| 2013/0159021 A1* | 6/2013 | Felsher | G16H 10/60 705/3 |
| 2013/0290716 A1 | 10/2013 | Gavrilov | |
| 2013/0340036 A1* | 12/2013 | Furukawa | G06F 21/6245 726/1 |
| 2014/0317741 A1* | 10/2014 | Be'ery | H04L 63/16 726/23 |
| 2015/0312263 A1 | 10/2015 | Bhamidipati et al. | |

OTHER PUBLICATIONS

International Search Report of Application No. PCT/IL2017/050522 dated Aug. 24, 2017.

Thilakanathan12, D., et al., "SafeProtect: Controlled Data Sharing with User-Defined Policies in Cloud-based Collaborative Environment". (Retrieved on Aug. 8, 2017). <https://www.researchgate.net/profile/Rafael_Calvo/publication/284709537_SafeProtect_Controlled_Data_Sharing_with_User-Defined_Policies_in_Cloud-Based_Collaborative_Environment/links/57f9516008ae91deaa616a5b.pdf>, Dec. 31, 2012.

* cited by examiner

SYSTEM AND METHOD FOR PRIVACY POLICY ENFORCEMENT

CROSS-REFERENCE TO RELATED APPLICATIONS

This application is a Continuation Patent Application of U.S. patent application Ser. No. 16/301,746, filed Nov. 15, 2018, which is a National Phase Application of PCT International Application No. PCT/IL2017/050522, International Filing Date May 11, 2017, claiming priority of U.S. Patent Application No. 62/336,764, filed May 16, 2016, which are hereby incorporated by reference.

FIELD OF INVENTION

The present invention relates to communication systems. More particularly, the present invention relates to architecture of communication systems and methods for enforcement of privacy policies that enable controlled reconciliation of data exchange and metadata gathering.

BACKGROUND OF THE INVENTION

In recent years more and more communication sessions are being biased (in terms of shared data and application usage) toward one party which has specific advantages that can be raised from either technology superiority or formal regulation power, and/or any other item. Such biasing may occur due to rapid development of communication related software, as well as due to development of computer technology. Furthermore, currently there are no means to enforce and assure any privacy agreements or settlements between users and service providers so there is no sufficient tracking of privacy protocols.

Securing the privacy elements of a user's device engaging with other users (among others, with application providers) and/or conduct various transactions via a communication network by way of computer applications, has been a challenge for many years with the rapid development of computer technology. For example, social network providers use cookies and/or social plug-ins in computer's browsers and/or applications, such cookies may collect user's data. Plug-ins main role is to assist and improve user experience by: linking to websites, executing objects, "like" mark of content, "share" data and the like. Such plug-ins may be configured with additional hidden operators (e.g. special Java scripts) that stimulate collection of private data from user's devise to the social network provider's server.

Typically, communication sessions are carried out via open systems interconnection (OSI) architecture, which is a conceptual architecture characterizing and standardizing the communication functions of a telecommunication or computing system without regard to their underlying internal structure and technology. Its goal is the interoperability of diverse communication systems with standard protocols. This architecture partitions a communication system into numerous abstraction layers, wherein each layer serves the layer above it and is served by the layer below it. The original version of the model defines seven layers. At each level N, two entities at the communicating systems (layer N peers) exchange Protocol Data Units (PDUs) by means of a layer N protocol. Each PDU contains a payload, called the Service Data Unit (SDU), along with protocol-related headers and/or footers.

An example of commercial use of OSI architecture is the Internet protocol suite, in which computers, servers, routers and other devices' layout and set of communications protocols are used to form computer networks and/or communication systems. For example, TCP/IP provides end-to-end data communication functions. This functionality is organized into four abstraction layers which are used to sort all related protocols according to the scope of networking involved.

Another example may be for application providers wishing either to present pre-paid ads and/or sell statistical user's information to certain third parties, and are therefore, for instance, willing to enable in return user experience with their social application, whereby such application may verify that user information is available (as agreed between the parties) and not manipulated.

Another example may be for application providers that need to prove to formal regulatory entities (e.g. EU GDPR— general data protection regulations) that they meet the mutually agreed privacy settlement that represent the agreed privacy trade-off between the specific user and/or other specific application provider in full, in order to be relieved from regulatory limitations and fines.

SUMMARY OF THE INVENTION

There is thus provided, in accordance with some embodiments of the invention, a method of privacy policy enforcement to ensure reconciliation between users communicating via an open system interconnection (OSI) communication architecture, the method comprising receiving a privacy policy for at least one user's device; receiving a usage policy for at least one user, wherein the usage policy defines at least a first usage level and a second usage level, wherein the first usage level corresponds to a first privacy policy and the second usage level correspond to a second privacy policy; receiving encryption codes; receiving at least one dataset from a first user to be sent to a second user, wherein the at least one dataset comprises at least one data segment; encrypting by a first server the received data segments; receiving a privacy policy enforcement vector, having decryption keys corresponding to the encryption codes and configured to allow decryption of data segments corresponding to a match between the user policy and the usage policy; and performing selective decryption, by a second server, for each data segment. According to some embodiments, data segments that correspond to a match between the privacy policy and usage policy may be decrypted. According to some embodiments, at least one of the first server and the second server may be external to the first user and second user In some embodiments, at least one user may be a service provider.

According to some embodiments, the method may further comprise creating a privacy policy matrix from the received privacy policy and usage policy.

According to some embodiments, the privacy policy matrix may be stored in a privacy settlement bureau.

According to some embodiments, the method may further comprise identifying at least one data segment that is applicable to be processed for privacy policy enforcement.

According to some embodiments, the method may further comprise marking data segments that are not decrypted.

According to some embodiments, the method may further comprise nullifying data segments that are not decrypted.

In some embodiments, the encryption may be carried out upstream.

In some embodiments, the decryption may be carried out downstream.

According to some embodiments, the method may further comprise sending at least the decrypted data to the second user.

According to some embodiments, the method may further comprise sending non-decrypted data to the second user.

In some embodiments, data may be received via the open system interconnection (OSI) communication architecture.

In some embodiments, data may be transferred via the open system interconnection (OSI) communication architecture.

According to some embodiments, at least one of the first server and the second server may be part of the network infrastructure of the OSI communication architecture Furthermore, in accordance with another embodiment of the invention, a system for privacy policy enforcement to ensure reconciliation between users communicating via a network having an open system interconnection (OSI) communication architecture is provided, the system comprising at least one database, configured to store a privacy policy of a first user and a usage policy of a second user; a privacy layer added to OSI architecture, in communication with at least one user's device; a privacy settlement bureau, in communication with the OSI network and configured to allow control of encryption and of decryption of data; and at least one processor, configured to allow encryption and at least another processor to allow decryption of data passing through the privacy layer. According to some embodiments, data segments corresponding to a match between privacy policy and usage policy may be decrypted by the at least one processor. According to some embodiments, at least one processor may be external to the first user and second user In some embodiments, at least one user may be a service provider.

In some embodiments, the encryption may be carried out upstream.

In some embodiments, the decryption may be carried out downstream.

According to some embodiments, data segments that do not correspond to a match between privacy policy and usage policy may be nullified.

In some embodiments, a first server may be configured to allow encryption of the data, and a second server may be configured to allow decryption of the data.

In some embodiments, data may be transferred via the open system interconnection (OSI) communication architecture.

According to some embodiments, at least one processor is part of the network infrastructure of the OSI communication architecture

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
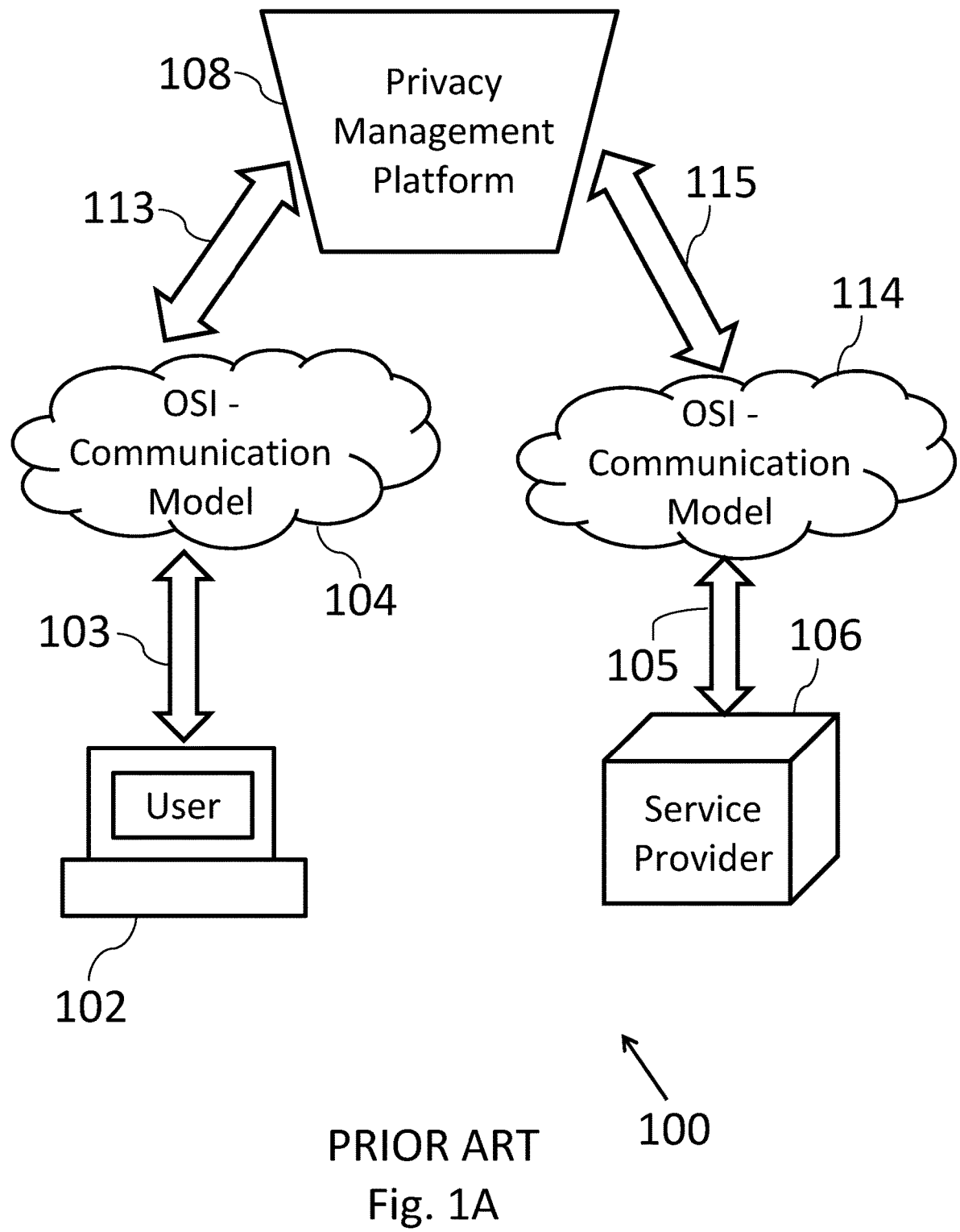
FIG. 1A schematically illustrates a known communication system with a privacy management platform.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

It should be noted that as used herein, the term data may refer to private data and/or data that has been identified as such that is structured as any type of data including datasets (e.g. cluster, grouping and/or integrated data), data segments and/or data fragments (e.g. private information unit and/or user experience unit and/or any other data unit selected as private data by users). As used herein the term data may also refer to any type of information, signals, metadata, artificial intelligence algorithm output, bots output, automatic robots operation, and the like. In some embodiments, data as used hereinafter may also include applicable or relevant data, for example information which might be generated separately and/or as a response to a request by the user and/or by the service provider.

Figure 1B:
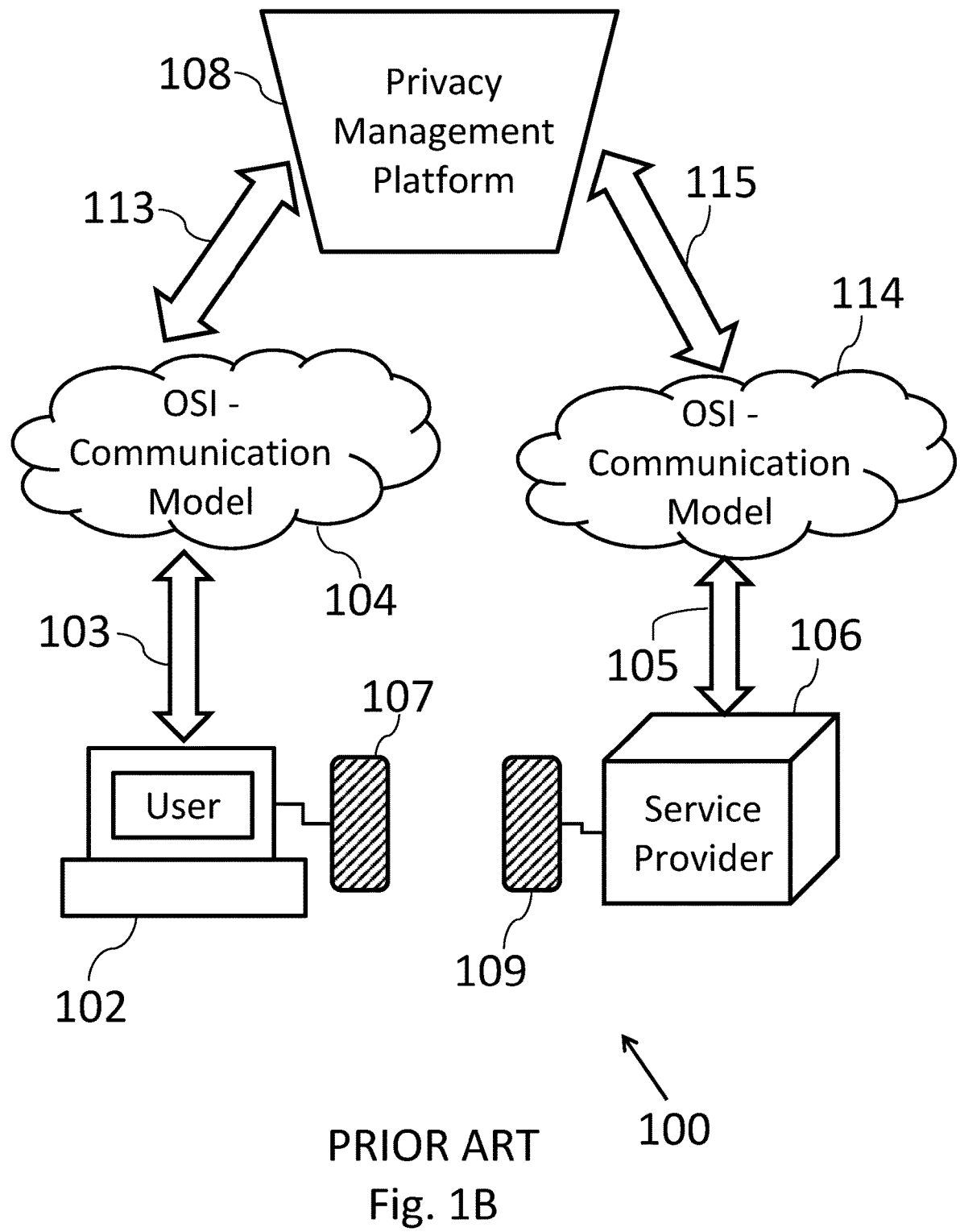
FIG. 1B schematically illustrates a known communication system with privacy management platform and local control units.

Reference is now made to FIGS. 1A-1B, which schematically illustrate a known communication system 100 with a privacy management platform 108. Communication system 100 connects a user 102, for instance using a computerized device, with a service provider 106 that provides some service to the user via at least one communication network 104, 114. It should be appreciated that as used herein, the term network may refer to a wired, wireless and/or cellular network.

Network 104, 114 comprises an open systems interconnection (OSI) architecture that operates as a third party in communication with a privacy management platform 108 providing a policy for engagement (e.g. in communication sessions) between the user 102 and the service provider 106 such that neither the user nor the service provider influence and/or control OSI architecture of network 104, 114 (e.g. controlling communication of private data via parallel system(s) and/or privacy management platform).

It should be noted that data passing from user 102 to service provider 106, initially passes upstream 103 towards a first network 104 with OSI architecture, wherein the term upstream refers to the direction in which data can be transferred from the client to the server (e.g. uploading).

Then, data passes downstream 113 to privacy management platform 108 for privacy management, wherein the term downstream refers to the "opposite" direction in which data can be transferred from the server to the client (e.g. downloading). From privacy management platform 108 to service provider 106, data passes upstream 115 to second network 114 (also having OSI architecture), and then downstream 105 to service provider 106. It should be appreciated that in such a communication system all information must pass through OSI architecture via protocol of network 104, 114 and then in addition, all information must pass through privacy management platform 108 therefore creates additional high network traffic passing through the privacy management platform 108, thereby creating lower efficiency, which may require additional (e.g. doubled) hardware means (additional routers, servers, and the like, in order to process all network protocol and privacy enforcement) together with additional processing time.

It should be noted that for data passing from service provider 106 to user 102, the direction of data may be reversed. Specifically, data may be uploaded upstream 105 to second network 114, then downstream 115 to privacy management platform 108, then upstream 113 to first network 104, and finally downstream 103 to user device 102.

At least some of privacy policy enforcement may be executed at local units (e.g. such architecture may include partial privacy enforcement by local unit(s), partial controlling communication of private data via parallel system(s) and/or quasi privacy management platform). As illustrated in FIG. 1B, the communication system 100 may further comprise a user's privacy control unit 107, and a service provider's privacy control unit 109. Thus, objectivity of the system and the network protocol may be compromised and manipulated in case that additional elements have access to end units, wherein such privacy control units 107, 109 may at least partially enforce privacy policy of transferred data instead of all privacy policy enforced by privacy management platform 108. It should be appreciated that in such a communication system, objectivity may be lost since privacy is managed at the end units (i.e. the users) instead of a third party.

It should be noted that as used herein, the term network may refer to any wired, wireless, global and/or local, cellular, cloud based, or any other communication network.

Figure 2:
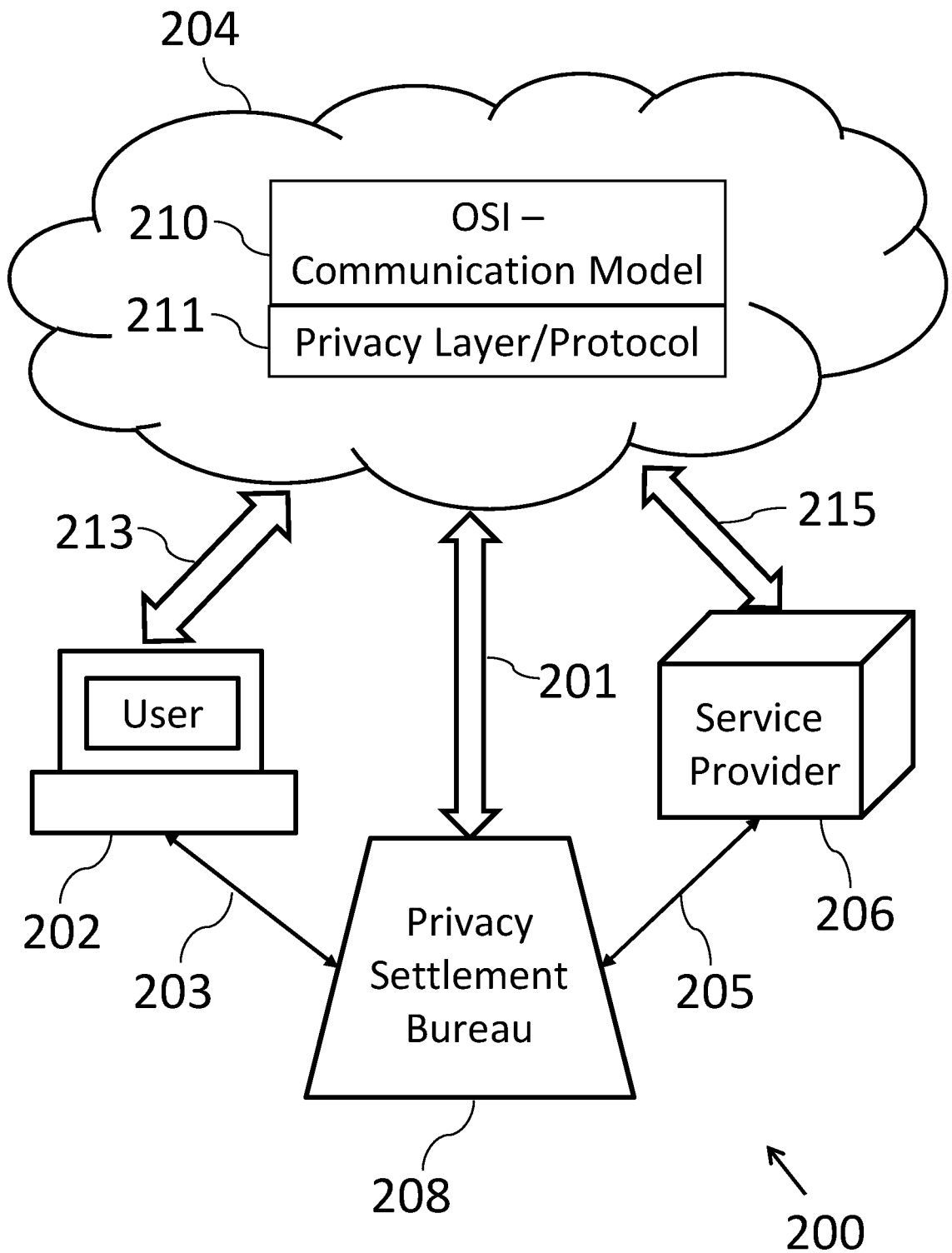
FIG. 2 schematically illustrates a communication system with an extended OSI architecture including a privacy layer, according to some embodiments of the invention.

Reference is now made to FIG. 2, which schematically illustrates a communication system 200 with a privacy layer 211, according to some embodiments of the invention. It should be appreciated that with this communication system 200, different types of data may be transferred to different elements. Similarly to the system shown in FIGS. 1A-1B, specific privacy policy configuration may be set up for a user 202 via communication network 204 (e.g. a wired, a wireless network or a cloud based network), wherein user 202 may define all privacy preferences regarding data fragments and services (e.g., private data and user experience) to be obtained from service provider 206. It should be noted that in some cases a service provider may also be considered as a "user" communicating with a different service provider.

In some embodiments, service provider 206 may also provide general default options to user 202 regarding privacy settings with a corresponding usage policy. It should be noted that such general options are not specific to a particular user, whereby the user is not identified. An example for a privacy policy may be sharing location and output of social plug-ins (e.g. application plug-ins, SDK's, API's and browser plug-ins, such plug-ins are usually created as operators and/or communication utilities for improved and efficient user experience that link between activities, share content and support services), and an example for a usage policy may be allowing access to application data and content, for instance a usage policy to provide service subject to receiving advertisements or not from service provider 206. In some embodiments, service provider 206 may also specifically define user experience parameters and communicate with network 204, as further described hereinafter.

In some embodiments, network 204 may comprise an open systems interconnection (OSI) architecture 210 that may act as a third party providing a policy and/or protocol for engagement (i.e. communication session) between the user 202 and the service provider 206 such that neither the user nor the service provider may influence, or manipulate the policy by controlling OSI architecture 210 of network 204.

According to some embodiments, OSI architecture 210 may have an abstraction layer based structure, for instance in a non-limiting embodiment having seven data layers, wherein each data layer communicates with neighboring layers and differently enlarge and/or reduce the data string (e.g. by adding layer related payload and/or change in template and/or protocol related header and/or footer). In some embodiments, an additional privacy layer or protocol 211 may be added to the layer structure of OSI architecture 210 while maintaining its layer structure (i.e. changing the data string and serving the layer above, and being served by the layer below), such that the main architecture of the system may be maintained, as an extended OSI architecture. It should be noted that privacy layer or protocol 211 may be utilized for sharing of data and metadata based on preferences of users, as further described hereinafter. It should be appreciated that in contrast to some commercially available solutions, only a single already existing network 204 may be required since there is no longer a need for adding separate duplicate infrastructure (e.g. servers, routers and the like) and all communication may pass through the same network 204.

It should be noted that communication between user 202 and network 204, for instance including the extended OSI architecture 210 and 211 may be set up and defined with specific configurations for each user 202 (e.g. selected level of user experience made of content, activities and/or services to be shared by the service provider with the user). Thereby defining the initial privacy input level that arrives to user 202. With such connection, user 202 may for instance view and/or modify and/or reset the privacy settings. In some embodiments, data arriving from user 202 (e.g. as a dataset) may be fragmented to multiple data fragment units that may be shared with other users and/or service providers, for example user's device information, and/or result of and/or response to a social plug-in script.

Similarly, communication between service provider 206 and network 204 may be set up and defined with general configurations for each service and content (e.g., user experience unit) using at least one privacy input object and one output level of the service. In some embodiments, the default configuration for all services may be defined as "closed" such that communication may be established only when both parties (i.e. user and service provider) agree to share particular content item. In some embodiments, data arriving from service provider 206 (e.g. as a user experience cluster) may be fragmented or split into multiple user experience units that may be later enabled for other users and/or service providers, for example content information or advertising.

According to some embodiments, user 202 and service provider 206 may further communicate with a Privacy Settlement Bureau (PSB) 208 (e.g. server implemented as a separate, remote server and/or cloud based server and/or other independent set of servers, managing policies remotely form the user and the service provider in order to maintain objectivity and be able to certify the settlement as required by official authorities), for instance via network 204 or some other network. Privacy settlement bureau 208 may communicate with OSI architecture 210 with added privacy layer 211 via network 204, so as to control privacy configurations of data transfer between user 202 and service provider 206. In some embodiments, privacy preferences for user 202 may be initially set up with a first connection 203 to privacy settlement bureau 208, and similarly general usage preferences for service provider 206 may be initially set up with a second connection 205 to privacy settlement bureau 208. Thus, privacy settlement bureau 208 may receive only the privacy policy and usage policy from user 202 and service provider 206 (respectively) such that additional information may be transferred to other elements, as further described hereinafter. In some embodiments, privacy policy and usage policy may be received as a privacy matrix, having various privacy vectors for different users.

According to some embodiments, all data transferred may be in "normally closed" state (i.e. closed by default), meaning that all data may be initially (upstream) encrypted. In case that the privacy policy of user 202 matches the usage policy of service provider 206, for specific segments of data, then this data may be (downstream) exposed 209 (or decrypted). In some embodiments, a data segment not matching (or contradicting) the privacy policy may be shown as non-decrypted unreadable marked junk data segments, and/or nullified, for instance replaced with a random string of characters, or replaced with a predefined string of marked junk characters and/or null.

It should be appreciated that privacy layer 211 may be added utilizing the same communication network 204 (such that additional servers and routers and other network hardware elements are not required), while maintaining the full objectively control of data transfer between user 202 and service provider 206 (e.g. for certification purpose).

Figure 4:
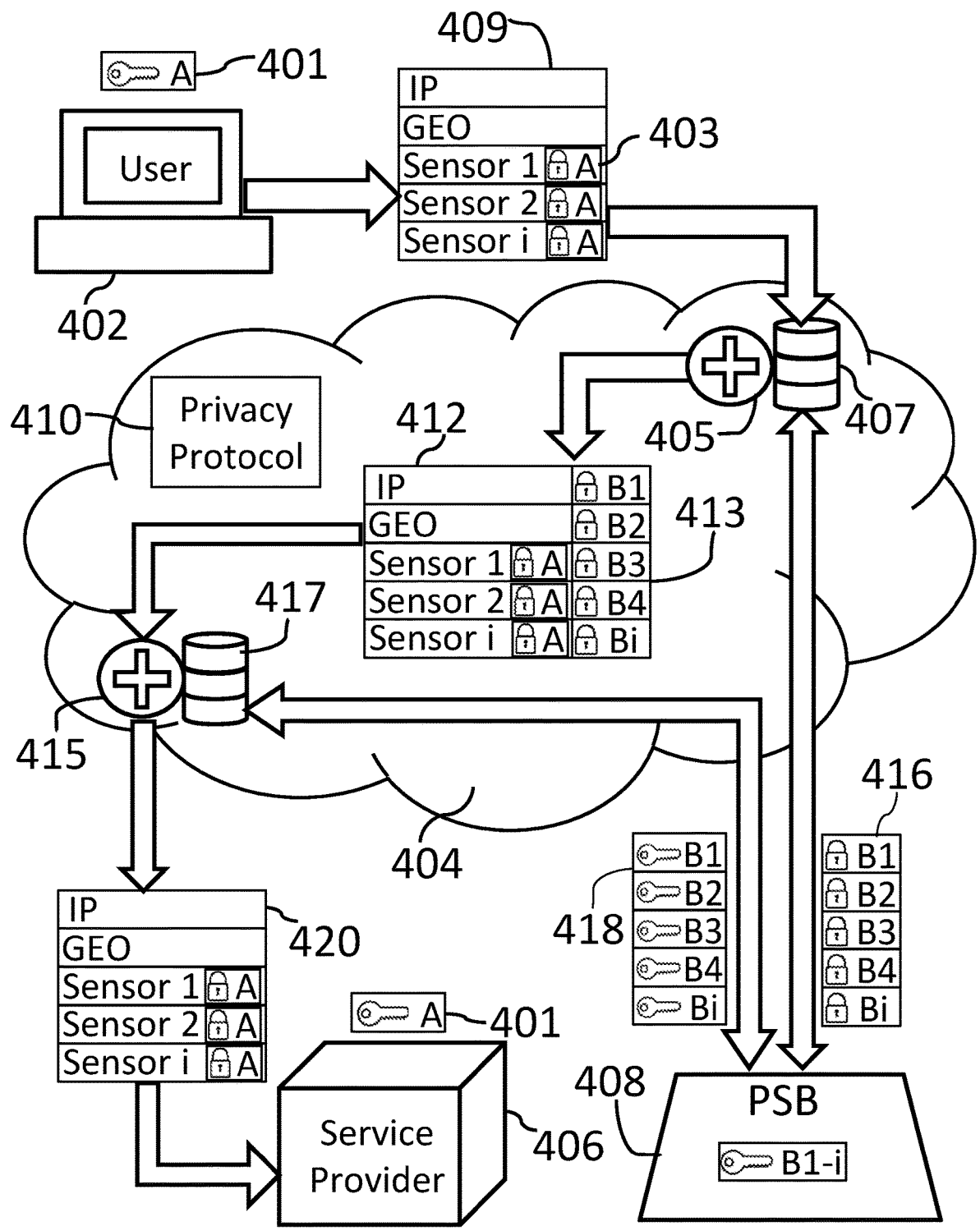
FIG. 4 schematically illustrates data flow in a communication session from a user to a service provider within the open communication system, according to some embodiments of the invention.

It should be noted that service provider 206 may have an initial encryption on all data (that is unchanged by system 200), and the encryption of system 200, passing through privacy layer 211, may be added as a second (upstream) encryption layer of data to that initial encryption, for example initial encryption "A" as shown in FIG. 4. In some embodiments, such second encryption layer (for example encryption "B" as shown in FIG. 4) may provide in real-time encryption based on predefined parameters that user 202 and service provider 206 are willing to expose (e.g. matching privacy policy), and also parameters that user 202 and service provider 206 are not willing to expose (e.g. not matching and/or contradicting privacy policy and thereby marked and non-decrypted).

In some embodiments, data transferred from user 202 may pass to privacy layer 211 on a separate channel 213, and similarly data transferred from service provider 206 may pass to privacy layer 211 on a separate channel 215. In some embodiments, all data passing through privacy layer 211 may be monitored by privacy settlement bureau 208, for instance with predefined session control 201.

According to some embodiments, data transfer between user 202 and service provider 206 may be encrypted and/or decrypted based on privacy policy and usage policy that are initially provided to privacy settlement bureau 208 with first connection 203 and second connection 205, as described above. Thus, data from user 202 may pass upstream to network 204 so as to undergo encryption by privacy layer 211 within the extended OSI architecture. Then, a session 201 with privacy settlement bureau 208 applying privacy policy vector may check or compare privacy policy with usage policy so as to provide privacy layer 211 with elements to enforce privacy policy preferences (from user 202) that match usage policy and should therefore be decrypted, as further described in FIG. 4. The decrypted data may then pass downstream from network 204 to service provider 206, while elements that do not match and/or contradict the usage policy may pass non-decrypted as marked junk data.

Similarly, data from service provider 206 may pass upstream to network 204 so as to undergo encryption by privacy layer 211 of extended OSI model. Then, a session 201 with privacy settlement bureau 208 applying usage policy vector may check or compare privacy policy with usage policy so as to provide privacy layer 211 with elements of usage policy level (from service provider 206) that match privacy policy and should therefore be decrypted, as further described in FIG. 5. The decrypted data may then pass downstream from network 204 to user 202, while elements that do not match and/or contradict the usage policy may pass non-decrypted as marked junk data and/or nullified. It should be appreciated that with such a system objectivity may be maintained, since privacy settlement bureau 208 only stores privacy policy and usage policy while encryption and decryption are carried out with privacy layer 211 within the external network 204.

In some embodiments, such a system may also prevent access to automatic/computerized artificial intelligent robot's behavior trying to bypass privacy layer and/or protocols since an additional layer of data is created and such a robot cannot penetrate the user or service provider as the privacy layer is "normally closed". For example, an alert may be created if the system identifies a manipulation attempt on the privacy layer.

According to some embodiments, such a communication system 200 having an addition privacy layer 211 (as an extended OSI model) may allow controlled, structured and consistent reconciliation of data exchange and metadata gathering between users.

It should be appreciated that adding the privacy layer and/or protocol to the OSI architecture as the extended OSI may be carried out as part of the OSI layer structure and may include several steps (for instance implemented as a script or algorithm) that may include initially identifying relevant or applicable data (e.g. private data items such as user's location, user's browser history and the like and user experience items by the service provider such as retrieve data from external source, activate external service and the like), such that only data types that may be treated by such a communication system are processed, i.e. data from user and/or service provider to be encrypted and decrypted according to privacy and usage policy. After such identification, all data may be (upstream) encrypted and then data segments corresponding to a match between the privacy policy and the usage policy are (downstream) selectively decrypted while the remaining data segments (with no-match and/or contradicting policy) are not-decrypted (e.g. marked and then nullified or become junk data). It should also be noted that such a privacy layer may also maintain data transfer structure between layers of the OSI architecture so an additional step of integrating of access to and/or from other layers (i.e. changing the data string and serves the layer above and being served by the layer below) may also be implemented. Thus, the operation of adding an additional privacy layer to the OSI model may be regarded as equivalent to carrying out these steps.

Figure 3:
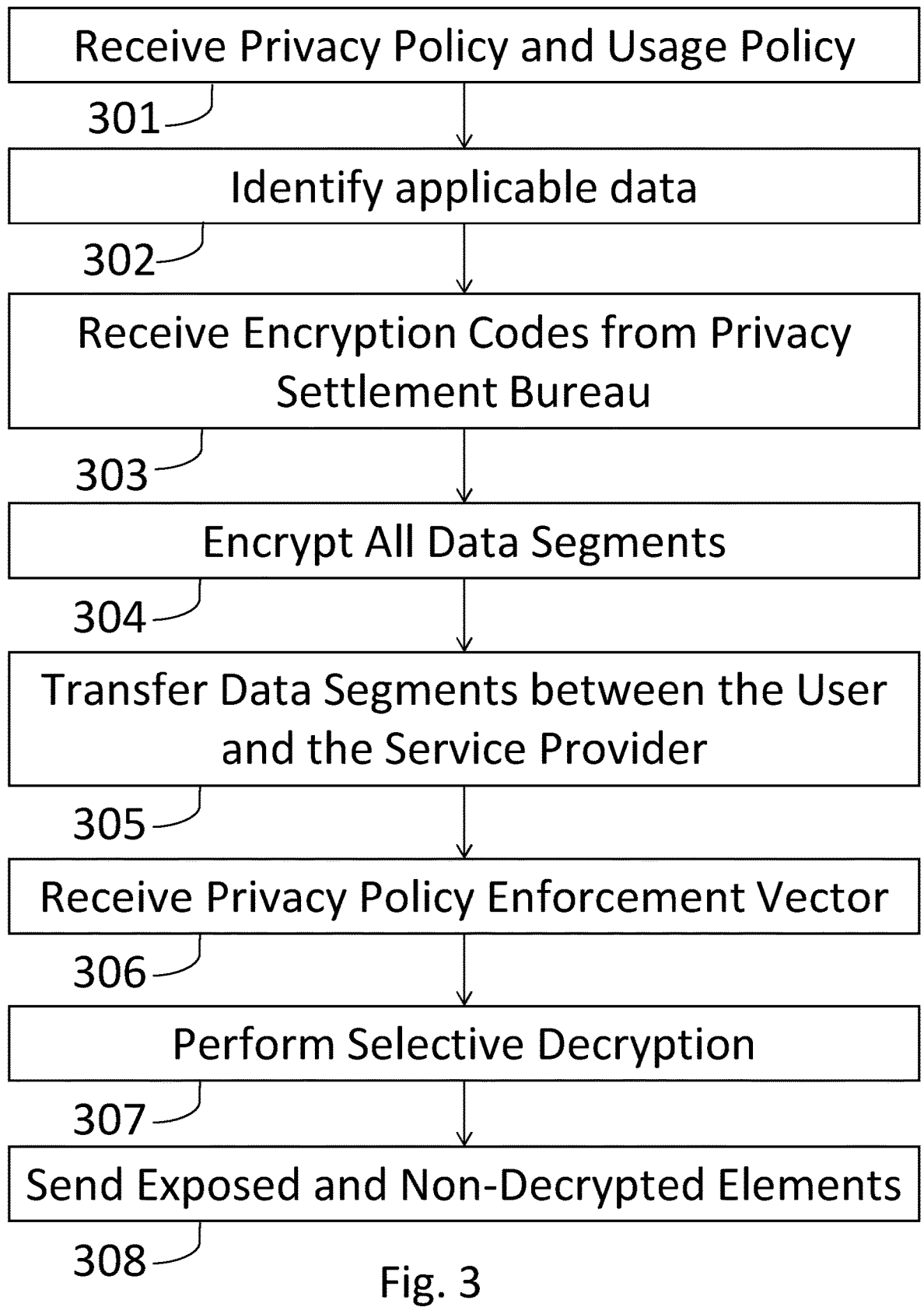
FIG. 3 shows a flow diagram for privacy policy enforcement between a user and a service provider, according to some embodiments of the invention.

Reference is now made to FIG. 3, which shows a flow diagram for privacy policy enforcement between a user and a service provider, according to some embodiments. Initially, privacy policy for at least one user device and usage policy for at least one service provider may be received 301, for instance by the privacy settlement bureau via the OSI architecture. For example, privacy policy and usage policy may be received by privacy settlement bureau during initial setup of the system, e.g. as described in FIG. 2. In some embodiments, a service provider may be also considered as a user with a privacy policy and/or usage policy so as to allow communication between at least two users. It should be noted that the usage policy may define at least two usage levels, a first usage level and a second usage level, wherein the first usage level may correspond to a first privacy policy and the second usage level may correspond to a second privacy policy. For example, a service provider offering different usages to which the user has different privacy policies.

Next, a fragmented dataset that is applicable (e.g. private data items such as user's audio sensor output, user's web search history and the like and user experience items by the service provider such as updated data at external source, activate link for closed list of members and the like) to be processed by the system may be identified 302, for instance as part of adding a privacy layer to an OSI architecture (thereby creating the extended OSI architecture) so as to allow data segments transmitted between the user's device and the service provider, wherein the privacy layer may comprise some reference information, such as communication session identification, regarding the privacy policy and the usage policy. Encryption codes may then be received 303 from the privacy settlement bureau, with selective corresponding decryption keys to be provided at a later stage. All data segments may then be encrypted 304 and then transferred 305 between the user and the service provider. For example, encrypt (upstream) all data passing from user to network via extended OSI architecture.

Next, privacy policy enforcement vector may be received 306 by privacy layer of extended OSI architecture, for example received from privacy settlement bureau. Based on the privacy policy enforcement vector, encrypted elements of data may be selectively decrypted or exposed 307 to be read by the other party (e.g. read by service provider).

In case that data segments do not correspond to a match (or contradict) at least one of the privacy policy and the usage policy, then these data segments may be marked and thereby remain as non-decrypted, as marked junk data and/or nullify that cannot be read by the other party. Finally, the fragmented dataset (e.g., data segments) may be sent 308 to the other party, with elements that are exposed (i.e. decrypted) and possibly with elements not matching privacy policies that appear as non-decrypted, marked junk data and/or nullify, such that enforcement of privacy policy may be finally achieved.

According to some embodiments, such privacy policy enforcement vector may allow controlled, structured and consistent reconciliation of data exchange and metadata gathering between users (e.g. to enable official certification issuance).

Reference is now made to FIG. 4, which schematically illustrates data flow from a user 402 to a service provider 406 within the communication system, according to some embodiments. It should be appreciated that FIG. 4 illustrates an exemplary data flow within communication system 200, for instance as shown in FIG. 2.

User 402 may provide a dataset of data segments 409, for instance a dataset (or list) with an array of different data types, having information regarding at least one of internet protocol (IP) address, geographic location, and data from at least one sensor 1-$i$, for instance data from camera sensor. It should be noted that while some data types are general data structure (e.g. IP address), other information and/or signal may be specific data structure such as mouse movement over the screen, so at least some of the information in dataset 409 may be chosen by the user as initially locked 403 in the user privacy policy. In some embodiments, dataset 409 may include data fragment units.

In some embodiments, some elements in dataset 409 are initially encrypted 403 (e.g. by an external application) prior to usage of privacy policy. This initial encryption may be later decrypted (externally of the communication system described herein) after data transfer between user 402 and service provider 406 is completed such that this basic encryption 403 may not affect the encryption 413 of the privacy protocol 410 as these two encryption methods are separated by different layers and cannot combined. For example, a data fragment initially encrypted 403 by an external party (e.g. by a social application) is further encrypted 413 by privacy protocol 410 so that only after encryption by privacy protocol 410 is removed (i.e. decrypted if match to privacy policy), the initial encryption 403 may also be removed by the external application provider.

Dataset 409 may then be transferred to network 404 (e.g. wired or cloud based network) having privacy protocol 410, and passed to a first server (or processor) 407 to be encrypted (upstream) 405 such that each and every element in the dataset receives a corresponding upstream encrypted element B1-Bi 413 to create encrypted dataset 412. It should be noted that encryption 413 by first server 407 corresponds to the direction of data, and since data transferred from user 402 to network 404, the transfer is upstream and all data is therefore encrypted 405 with privacy protocol 410. In the opposite case, as for example illustrated in FIG. 5, data passes downstream from network 404 to user 402.

It should be appreciated that first server 407 may receive a privacy enforcement vector 416 with codes for encryption 405 of dataset 409. The selective corresponding keys vector 418, for codes vector 416, may then be sent to second server 417 for decryption 415, as further described hereinafter. It should be noted that as used herein, first and second servers refer to logic references for the servers and not necessarily to sequential servers as additional servers may be implemented between the first and second servers.

It should be appreciated that privacy settlement bureau (PSB) 408 may control encryption of codes or locks B1-Bi 416 and corresponding keys B1-Bi 418 as part of the privacy policy vector. Thus, considering open communication between PSB 408 and either first server 407 or second server 417 both encryption and decryption may be controlled by PSB 408, for instance based on the received privacy policy vector. It should be noted that keys set 418 loaded to the servers may correspond to privacy policy, such that only upon a match to the privacy policy the key may unlock a corresponding lock (e.g., decrypt an encrypted data segment).

Next, encrypted dataset 412 may transfer data to a second server (or processor) 417 for downstream exposure or decryption 415 with privacy policy vector from PSB 408 to settle and assure user 402 privacy policy and usage policy of service provider 406.

It should be appreciated that second server 417 may ask PSB 408 for keys to decrypt all elements of dataset 412, and PSB 408 may then determine which elements to decrypt and which elements to keep non-decrypted (e.g. marked and then become junk data and/or nullify) by selectively not providing the corresponding key(s).

During downstream decryption 415, privacy protocol 410 may determine if all elements in encrypted dataset 412 have corresponding policy elements such that there is no mismatch between the privacy policy and the usage policy. Thus, after downstream decryption 415 a remaining decrypted dataset 420 may be finally received by service provider 406. It should be noted that in case that some element in encrypted dataset 412 does not correspond to a match between and/or contradicting privacy policy and usage policy, then this element may not be decrypted, marked and then become marked junk data and/or nullify while all other elements (corresponding to a match) may be decrypted.

In some embodiments, if there is no communication between user 402 and service provider 406 all data may be received as non-decrypted and marked junk data (i.e. initially closed) and/or nullified.

Figure 5:
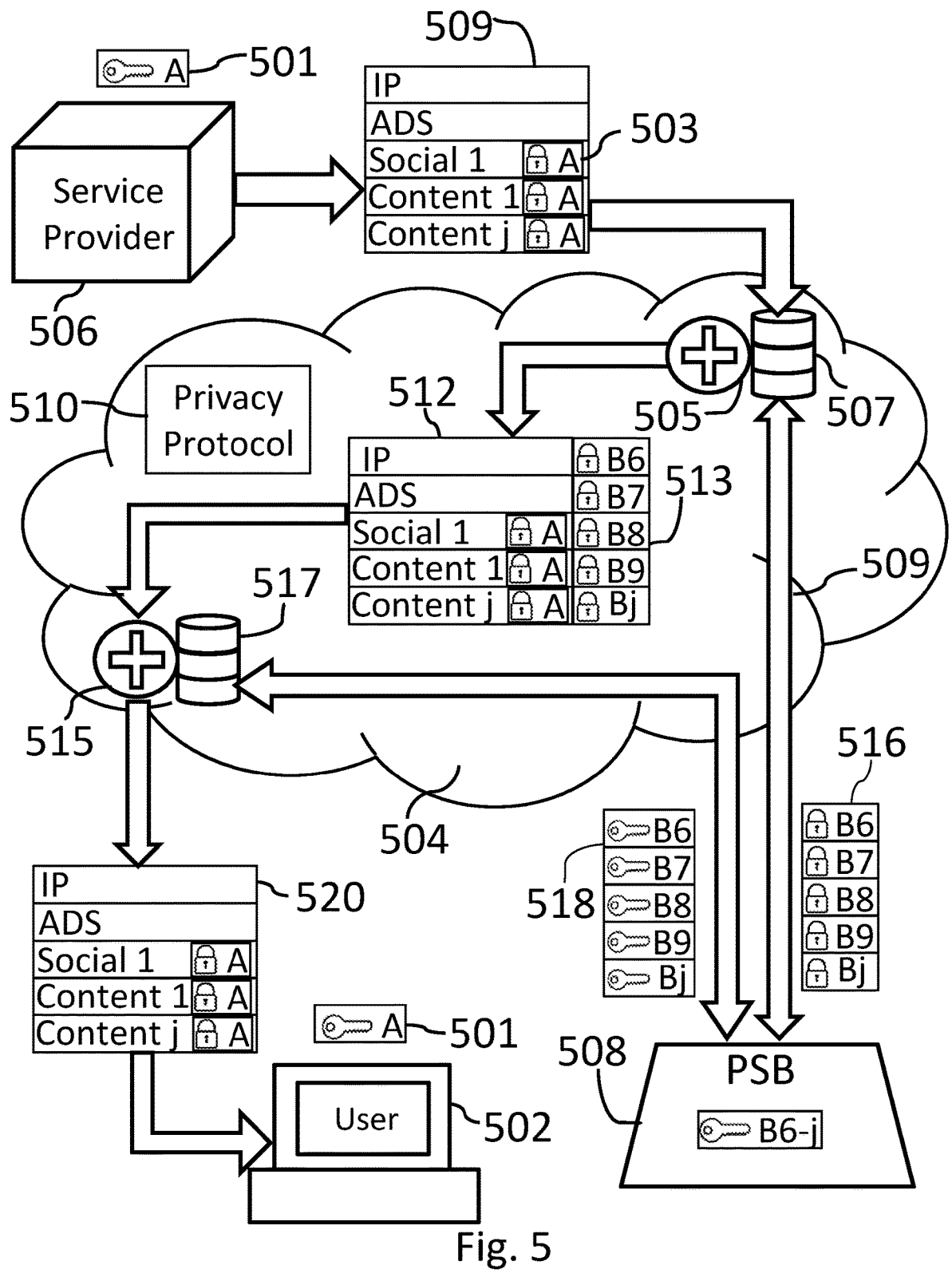
FIG. 5 schematically illustrates data flow in a communication session from a service provider to a user within the open communication system, according to some embodiments of the invention.

Reference is now made to FIG. 5, which schematically illustrates data flow from a service provider 506 to a user 502 within the open communication system, according to some embodiments. It should be appreciated that FIG. 5 illustrates an exemplary data flow within communication system 200, for instance as shown in FIG. 2.

Service provider 506 may provide a dataset 509, for instance a dataset (or list) with an array of different data types, having information regarding at least one of internet protocol (IP) address, advertisements to be presented on the user's screen, social information and/or signal, and data from at least one content 1-*j*. In some embodiments, dataset 509 may include fragmented user experience units.

In some embodiments, some elements in dataset 509 may be initially encrypted or locked 503 (by an external application) prior to implementing the usage policy by the policy protocol 510.

It should be appreciated that privacy settlement bureau (PSB) 508 may control encryption of locks B1-Bj 516 and corresponding keys B1-Bj 518. Thus, with open communication between PSB 508 and either first server 507 or second server 517 both encryption and decryption may be controlled by PSB 508, for instance based on the received privacy policy vector. It should be noted that set of keys 518 loaded to the servers may correspond to usage policy, such that only upon a match to the usage policy the key may unlock a corresponding lock (e.g., decrypt an encrypted data segment). It should be noted that as used herein, first and second servers refer to logic references for the servers and not necessarily to sequential servers as additional servers may be implemented between the first and second servers.

Dataset 509 may then be transferred to network 504 (e.g. wired or cloud based network) having privacy protocol 510, and passed to a first server (or processor) 507 to be encrypted 505 such that each element in the dataset receives a corresponding encrypted element B1-Bj 513 to create encrypted dataset 512. Next, encrypted dataset 512 may transfer data to a second server (or processor) 517 for selective decryption 515 with privacy policy vector from PSB 508 to settle and assure of user 502 and usage policy of service provider 506.

During decryption 515, privacy protocol 510 may determine if all elements in encrypted dataset 512 have corresponding policy elements such that there is no mismatch and/or contradiction between the privacy policy and the usage policy. Thus, after decryption 515 a decrypted dataset 520 may be finally received by user 502. It should be noted that in case that any element in encrypted dataset 512 does not correspond to a match in privacy policy and usage policy, then this element may be non-decrypted marked and then become junk data or nullify while all other elements (corresponding to a match) may be decrypted.

In some embodiments, if there is no communication between user 502 and service provider 506 all data may be received as decrypted and unreadable and/or nullify (i.e. initially closed).

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method for privacy policy enforcement to ensure reconciliation between users communicating via an open system interconnection (OSI) communication architecture, the method comprising:
   receiving a privacy policy for at least one user's device of a first user;
   receiving a usage policy for a user's device of a second user;
   modifying the privacy policy by the first user, such that the received usage policy is to allow access to data and content of the at least one user's device of a first user;
   receiving by a first server at least one dataset from the first user's device to be sent to the second user's device, wherein the at least one dataset comprises at least one data segment;
   encrypting by the first server the received at least one data segment based on received encryption codes;
   receiving a privacy policy enforcement vector, having selective decryption keys corresponding to the encryption codes and configured to allow decryption of at least one data segment when a match between the modified privacy policy and the usage policy occurs to decrypt the at least one data segment; and
   performing selective decryption, by a second server, for each data segment based on the privacy policy enforcement vector,
   wherein at least one of the first server and the second server is external to the first user's device and second user's device, and
   wherein the decrypted at least one data segment passes through a privacy layer added to OSI architecture, the privacy layer being in communication with the first user's device.

2. The method of claim 1, wherein the second user is a service provider.

3. The method of claim 1, further comprising identifying at least one data segment that is applicable to be processed for privacy policy enforcement.

4. The method of claim 1, further comprising sending at least the decrypted data to the second user's device.

5. The method of claim 1, wherein data is transferred or received via the OSI communication architecture.

6. The method of claim 1, wherein at least one of the first server and the second server is part of the network infrastructure of the OSI communication architecture.

7. The method of claim 6, wherein the network infrastructure of the OSI communication architecture is a single network such that all communications pass through the single network.

8. The method of claim 1, wherein the received privacy policy is for shared content and support services.

9. The method of claim 1, wherein the at least one data segment comprises at least one of: output of an artificial intelligence algorithm and output of an internet bot that is generated separately and/or as a response to a request by the user or by the service provider.

10. A method for privacy policy enforcement to ensure reconciliation between users communicating via an open system interconnection (OSI) communication architecture, the method comprising:
   receiving a privacy policy for at least one user's device of a first user;
   receiving a usage policy for a user's device of a second user;
   receiving by a first server at least one dataset from the first user's device to be sent to the second user's device, wherein the at least one dataset comprises at least one data segment;
   encrypting by the first server the received at least one data segment based on received encryption codes;
   receiving a privacy policy enforcement vector, having selective decryption keys corresponding to the encryption codes and configured to allow decryption of at least one data segment when a match between the privacy policy and the usage policy occurs to decrypt the at least one data segment; and
   performing selective decryption, by a second server, for each data segment based on the privacy policy enforcement vector,
   wherein at least one of the first server and the second server is external to the first user's device and second user's device,
   wherein the decrypted at least one data segment passes through a privacy layer added to OSI architecture, the privacy layer being in communication with the first user's device,
   wherein at least one of the first server and the second server is part of the network infrastructure of the OSI communication architecture, and
   wherein the network infrastructure of the OSI communication architecture is a single network such that all communications pass through the single network.

11. The method of claim 10, wherein the second user is a service provider.

12. The method of claim 10, further comprising identifying at least one data segment that is applicable to be processed for privacy policy enforcement.

13. The method of claim 10, further comprising sending at least the decrypted data to the second user's device.

14. The method of claim 10, wherein data is transferred or received via the OSI communication architecture.

15. The method of claim 10, further comprising modifying the privacy policy by the first user, such that the received usage policy is to allow access to data and content of the at least one user's device of a first user.

16. The method of claim 10, wherein the at least one data segment comprises at least one of: output of an artificial intelligence algorithm and output of an internet bot that is generated separately and/or as a response to a request by the user or by the service provider.

17. A method for privacy policy enforcement to ensure reconciliation between users communicating via an open system interconnection (OSI) communication architecture, the method comprising:
   receiving a privacy policy for at least one user's device of a first user;
   receiving a usage policy for a user's device of a second user;
   receiving by a first server at least one dataset from the first user's device to be sent to the second user's device, wherein the at least one dataset comprises at least one data segment;
   encrypting by the first server the received at least one data segment based on received encryption codes;
   receiving a privacy policy enforcement vector, having selective decryption keys corresponding to the encryption codes and configured to allow decryption of at least one data segment when a match between the privacy policy and the usage policy occurs to decrypt the at least one data segment; and
   performing selective decryption, by a second server, for each data segment based on the privacy policy enforcement vector,
   wherein at least one of the first server and the second server is external to the first user's device and second user's device,
   wherein the decrypted at least one data segment passes through a privacy layer added to OSI architecture, the privacy layer being in communication with the first user's device, and
   wherein the at least one data segment comprises at least one of: output of an artificial intelligence algorithm and output of an internet bot that is generated separately and/or as a response to a request by the user or by the service provider.

18. The method of claim 17, wherein at least one of the first server and the second server is part of the network infrastructure of the OSI communication architecture.

19. The method of claim 18, the network infrastructure of the OSI communication architecture is a single network such that all communications pass through the single network.

20. The method of claim 17, further comprising modifying the privacy policy by the first user, such that the received usage policy is to allow access to data and content of the at least one user's device of a first user.

* * * * *